United States Patent
Harris (10) Patent No.: US 10,064,117 B2
(45) Date of Patent: Aug. 28, 2018

(54) SYSTEM AND METHOD FOR MANAGING USER EQUIPMENT MOVEMENT DRIVEN CELL SYSTEM LOAD BALANCING

(71) Applicant: NOKIA SOLUTIONS AND NETWORKS OY, Espoo (FI)

(72) Inventor: John M. Harris, Glenview, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/765,030

(22) PCT Filed: Feb. 12, 2013

(86) PCT No.: PCT/IB2013/003239
§ 371 (c)(1),
(2) Date: Jul. 31, 2015

(87) PCT Pub. No.: WO2014/125323
PCT Pub. Date: Aug. 21, 2014

(65) Prior Publication Data
US 2015/0373613 A1 Dec. 24, 2015

(51) Int. Cl.
*H04W 4/00* (2018.01)
*H04W 36/32* (2009.01)
(Continued)

(52) U.S. Cl.
CPC .......... *H04W 36/32* (2013.01); *H04W 36/22* (2013.01); *H04W 84/045* (2013.01); *H04W 88/02* (2013.01)

(58) Field of Classification Search
CPC ... H04W 36/22; H04W 24/045; H04W 36/32; H04W 88/02
(Continued)

(56) References Cited

U.S. PATENT DOCUMENTS 7,162,250 B2 * 1/2007 Misra .................... H04W 16/08
455/445
7,822,544 B2 * 10/2010 Kotzin ............... G01C 21/3453
701/433
(Continued)

FOREIGN PATENT DOCUMENTS

CN 1792108 A 6/2006
CN 101808285 A 8/2010
(Continued)

OTHER PUBLICATIONS

International Search Report and Written Opinion dated Jul. 3, 2014 corresponding to International Patent Application No. PCT/IB2013/003239.
(Continued)

*Primary Examiner* — Man Phan
(74) *Attorney, Agent, or Firm* — Squire Patton Boggs (US) LLP (57) ABSTRACT

A system and method for managing offer and user equipment movement driven cell system load balancing that overcomes the disadvantages of the prior art. Network elements determine whether a user or user equipment in a first location is within a threshold distance of a second location of better coverage, which is separated from the first location by an intervening region of worse coverage. Upon such a determination, the network can provide a higher level of service as the user moves incrementally between the first and second locations.

20 Claims, 4 Drawing Sheets

(51) Int. Cl.
*H04W 36/22* (2009.01)
*H04W 84/04* (2009.01)
*H04W 88/02* (2009.01)

(58) Field of Classification Search
USPC ............... 370/229–254, 331–345, 329–331; 455/401–522; 709/203–237
See application file for complete search history.

(56) References Cited

U.S. PATENT DOCUMENTS

| | | | | |
|---|---|---|---|---|
| 7,978,674 | B1 * | 7/2011 | Oroskar | H04W 72/044 370/335 |
| 8,867,425 | B2 * | 10/2014 | Korus | H04W 76/00 370/280 |
| 9,025,463 | B1 * | 5/2015 | Mankee | H04W 72/0413 370/229 |
| 9,042,223 | B2 * | 5/2015 | Korus | H04W 76/002 370/230 |
| 9,100,832 | B2 * | 8/2015 | On | H04W 16/10 |
| 9,131,423 | B1 * | 9/2015 | Vargantwar | G01S 5/14 |
| 9,179,438 | B1 * | 11/2015 | Jintaseranee | H04W 68/02 |
| 9,204,346 | B1 * | 12/2015 | Pawar | H04W 24/02 |
| 9,510,237 | B2 * | 11/2016 | Nuss | H04W 28/08 |
| 9,603,054 | B2 * | 3/2017 | Zou | H04W 16/08 |
| 2007/0078597 | A1 | 4/2007 | Kotzin | |
| 2009/0325624 | A1 * | 12/2009 | Centonza | H04W 16/08 455/522 |
| 2010/0113060 | A1 * | 5/2010 | Bai | H04W 16/14 455/453 |
| 2011/0105139 | A1 | 5/2011 | On | |
| 2015/0009923 | A1 * | 1/2015 | Lei | H04W 72/0413 370/329 |
| 2015/0105085 | A1 * | 4/2015 | Tseng | H04W 36/04 455/444 |
| 2015/0215852 | A1 * | 7/2015 | Gou | H04W 48/16 455/434 |
| 2016/0006659 | A1 * | 1/2016 | Kim | H04W 36/20 370/235 |

FOREIGN PATENT DOCUMENTS

| | | |
|---|---|---|
| WO | WO 2004/105420 A1 | 12/2004 |
| WO | WO2004105420 A1 | 12/2004 |
| WO | WO 2008/090049 A1 | 7/2008 |

OTHER PUBLICATIONS

State Intellectual Property Office, People's Republic of China, Office Action corresponding to Application No. 201380072833.2, dated Jan. 2, 2018.

* cited by examiner

SYSTEM AND METHOD FOR MANAGING USER EQUIPMENT MOVEMENT DRIVEN CELL SYSTEM LOAD BALANCING

TECHNICAL FIELD

The instant invention relates to a novel mechanism for managing user equipment movement driven geographic load-balancing from a macrocell to a nearby small cell.

In a mobile, cellular or radio communication system, it is generally desirable, from both an operator perspective and an end-user perspective, for the user carried user equipment or user device (UE) to change geographic locations in certain cases, e.g. from a more loaded cell to a nearby less loaded (small) cell. "Small cells", as used herein, are low-powered radio access nodes that operate in licensed and unlicensed spectrum, and which may have a range of 10 meters to 200 meters, compared to a mobile macrocell, which may have a range of a few kilometers. With mobile operators struggling to support the growth in mobile data traffic, many are using mobile data offloading as a more efficient use of radio spectrum. Small cells may be present as an element to 3G data off-loading. Furthermore, Small cells may encompass femtocells, picocells, and microcells. Small-cell networks can also be realized by means of distributed radio technology consisting of centralized baseband units and remote radio heads. Small cells may operate in a wide range of air interfaces including GSM, CDMA2000, TD-SCDMA, W-CDMA, LTE and WiMax. In 3GPP terminology, a Home Node B (HNB) may be a 3G femtocell and a Home eNode B (HeNB) may be an LTE femtocell.

The change from a more loaded cell to a nearby less loaded (small) cell can yield more efficient use of RF resources through a sort of geographic load-balancing. However, in order for the user/UE to reach the more efficient location, the UE may need to travel through an "intervening region" which will often have worse/poor wireless service levels (relative to the user's current location).

Figure 1:
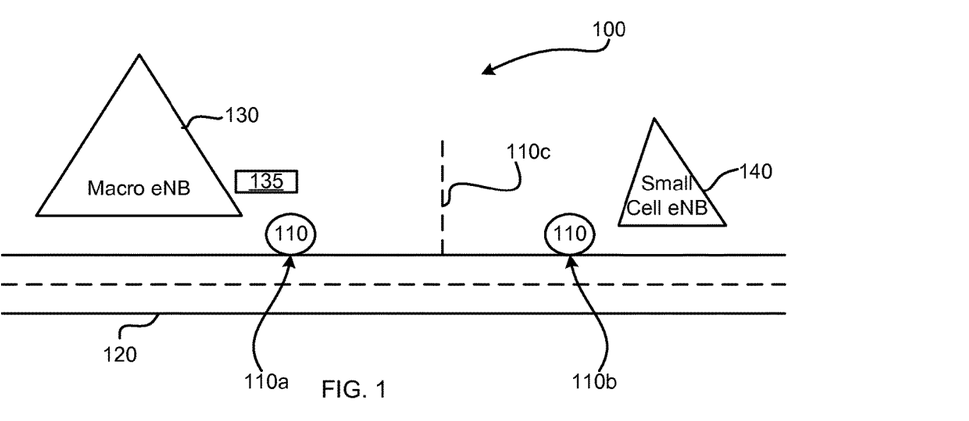
FIG. 1 shows a simplified map of elements useful in illustrating the relationship between user equipment and location for purposes of understanding the present invent.
Figure 2:
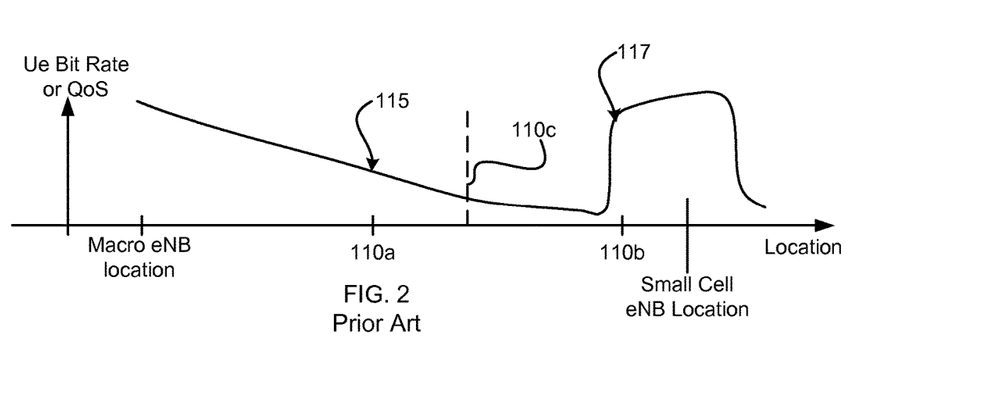
FIG. 2 is a graph showing the QoS for user equipment versus location along a path, in accordance with the prior art.

For example, referring now to FIGS. 1 and 2, a radio communication system 100 is provided that includes access nodes 130 and 140. Access node 130 controls a macro cell and is defined as a Macro-eNB. Access node 140 controls a small cell and is defined as a small cell eNB. Initially, a user bearing the mobile device UE 110 is at a first location 110*a* providing a first coverage/service-level 115 to the UE 110. At the location 110*b*, the UE 110 would have a second, better coverage/service-level 117 due to its proximity to the small cell eNB access node 140. However, in order to get from location 110*a* to location 110*b*, the user must move along a path 120 (for example, a pedestrian street) through an intervening region 110*c* having worse coverage/service levels than being provided to the UE 110 at location 110*a*, as can be seen from FIG. 2. Having poor reception in the intervening region 110*c* (as illustrated by the poor bit rate/QoS at this point in FIG. 2) will discourage a user of the UE 110 from moving from the location 110*a* to the location 110*b* and, thus, prevents geographic load-balancing from the Macro eNB 130 to the small cell eNB 140.

Prior systems have attempted to address load balancing. For example, U.S. Patent Application Publication No. 2011/0105139 to On discloses a method and apparatus for a self-organizing network that includes a plurality of base stations that coordinate radio resource allocation with other base stations. Paragraph [0021] of the reference to On discloses, among other things, coordinating radio resources related to spatial resource allocation, such as beam forming with neighboring network elements in a multi-level and/or multivariate manner.

Additionally, U.S. Pat. No. 7,822,544 to Kotzin discloses a method and system for providing navigation information wherein the method obtains the communication requirements of a user and determines at least one navigation route for the user based on the communication requirement dependent upon network considerations along the route.

The foregoing systems do not teach or suggest, among other things, allocating network resources to boost a service-level along a route in order to induce a user to move from a less efficient location towards a more efficient geographic load-balancing selected destination.

What is needed is a system and method that provides a network supervised mechanism for managing geographic load-balancing through improved resource prioritization, by selectively removing service degradation through an intervening location, and thereby avoiding discouraging the user from the movement necessary to achieve the operator and end user benefits of geographic load-balancing.

DISCLOSURE OF THE INVENTION

It is accordingly an object of this invention to provide a system and method for managing user equipment movement driven cell system load balancing in a mobile, cellular or radio communication network that overcomes the disadvantages of the prior art. More particularly, a system and method are provided for monitoring and managing user equipment moving from a first location that is less efficient, to a second location that is more efficient, through a third intervening region or location, by selectively removing service degradation through the intervening region or location. In one embodiment of the invention, network elements determine whether user equipment in a first location is within a threshold distance of a second location of better coverage, which is separated from the first location by an intervening region of coverage worse than is available at the first location. Upon such a determination, in one particular embodiment of the invention, the network offers or provides a higher level of service as the user moves incrementally between the first and second locations.

Although the invention is illustrated and described herein as embodied in a system and method for managing offer and user equipment movement driven cell system load balancing, it is nevertheless not intended to be limited to the details shown, since various modifications and structural changes may be made therein without departing from the spirit of the invention and within the scope and range of equivalents of the claims.

The construction of the invention, however, together with the additional objects and advantages thereof will be best understood from the following description of the specific embodiments when read in connection with the accompanying drawings.

BRIEF DESCRIPTION OF THE DRAWINGS

The present invention is illustrated by way of example, and not by way of limitation, in the figures of the accompanying drawings, in which like reference numerals refer to similar elements and in which.

BEST MODE FOR CARRYING OUT THE INVENTION

As discussed above in connection with FIG. 1, it is desirable to move the UE 110 from a more loaded Macro-eNB access node 130 to a nearby, less loaded small cell (i.e., small cell eNB) access node 140. Such a transfer provides a more efficient use of RF resources, for example, through geographic load-balancing in accordance with the present invention. For example, cellular system loading is highly nonuniform, with some cells being much more loaded than others. An estimated 40% of the radio resources in a typical cellular system can be wasted due to nonuniform loading. Users that move into a cell where physical resource blocks are currently being wasted (i.e., not currently being utilized) generate significant "load balancing like" efficiencies. Additionally, with the increasing prevalence of small cells, more users can move smaller distances and achieve yet larger increases in service-level and efficiency, providing for larger decreases in cellular system resources consumed. Further, users moving closer to a tower can reduce battery life drain and further reduce RF resource consumption, for example, from 5 to 60 times.

However, in order for the user to reach the small cell eNB access node 140, the user/UE 110 will often have to travel through an "intervening region", represented by the region 110c that bridges locations 110a and 110b, with even worse wireless service levels (i.e., bit rates or QoS) than the location 110a. The poor quality of service in this region 110c along the path 120 discourages the user with UE 110 from moving into region 110c. For example, consider a user that is in-between the Macro-eNB access node 130 and a relatively lightly loaded small cell eNB access node 140. While connected to the access node 130, the user/UE 110 would normally encounter lower throughput drops as it moves closer to the small cell access node 140. In another example, the user may need to move behind a building or other event creating an RF shadow while moving from the current location 110a to a location 110b that provides access to the more lightly loaded small cell access point 140. This lower throughput or RF shadow region will be referred to as the "intervening region", herein.

A system and method are provided herein that encourages a user of UE 110 to move from a first location that is less efficient, to a second location that is more efficient, despite the need to pass through a third intervening location of worse coverage/service. More particularly, the present invention provides improved monitoring and management to selectively remove the service degradation in the intervening region and thereby avoid discouraging the movement of the user/UE 110 necessary to achieve the operator and end user benefits of the geographic load-balancing targeted herein.

It may be that the intervening region generally provides lower service levels, by virtue of being yet farther from the serving cell, the macro cell 130 in the example of the present embodiment. In general, as a user/UE moves farther from the serving cell, the amount of RF resources required per byte transferred increases, and therefore, in many systems the service-level provided to that user e.g. the throughput achieved, declines as the user moves farther away from the serving (macro) cell. However, as will be understood in connection with the present invention, it is possible for the system to allocate a (disproportionately) larger amount of resources to such a user, even as the user moves farther away from the tower, such that the QOS does not decline, or possibly even increases as the user moves in the incentivized direction through the intervening region. Alternatively, the system of the invention may also use remote electrical tilt (RET) or active antenna systems, or other radio resource management/mechanisms to boost/incrementally increase the QoS provided in such an intervening region.

Figure 3:
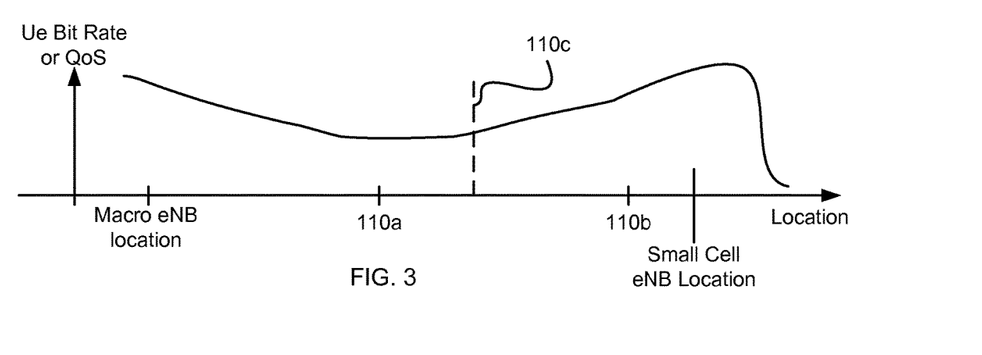
FIG. 3 is a graph showing the QoS for user equipment versus location along a path, in accordance with one particular embodiment of the present invention.
Figure 4:
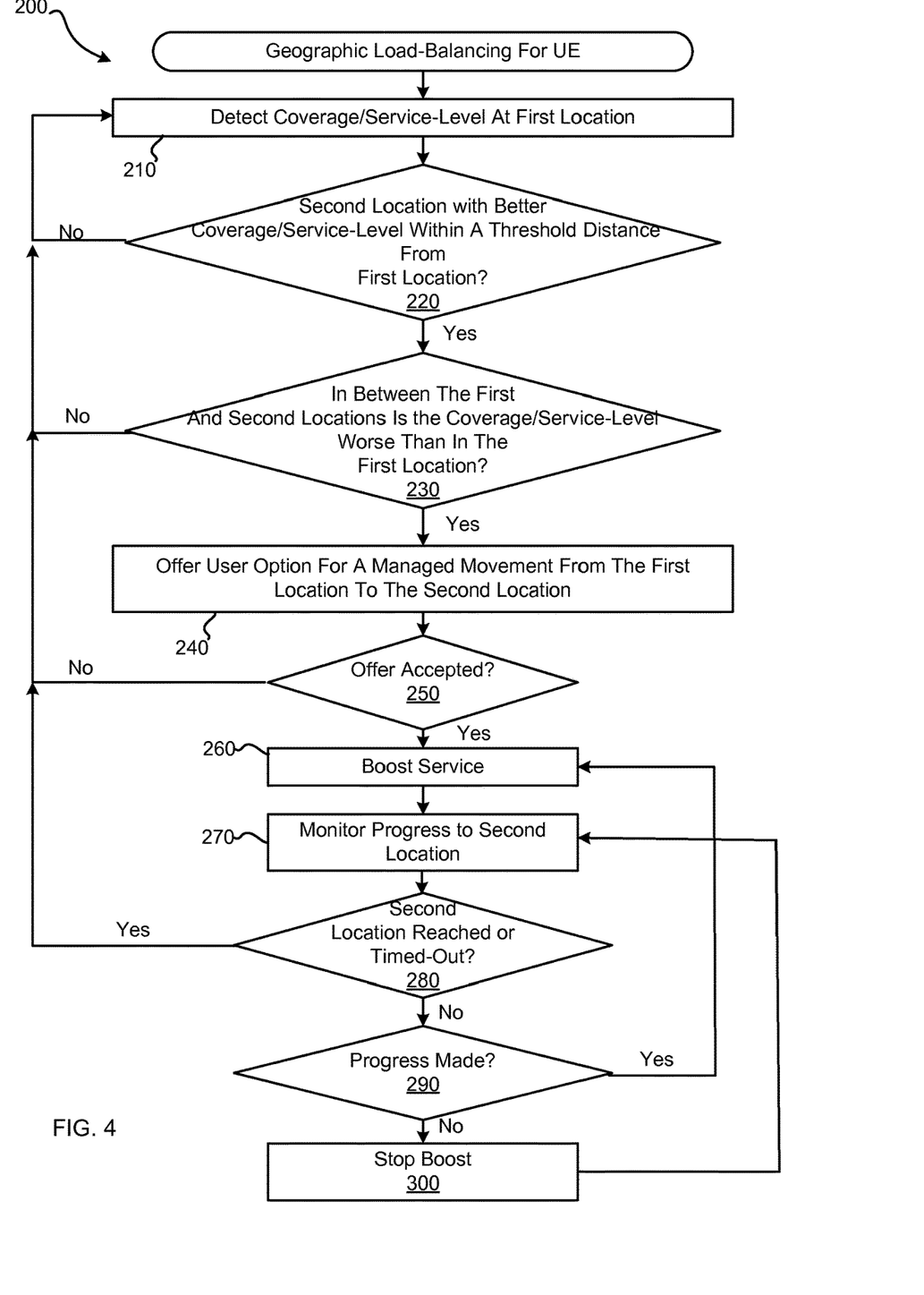
FIG. 4 is a block diagram of a method for performing load balancing in accordance with one particular embodiment of the invention.

Referring now to FIGS. 1 and 3-4, in accordance with one particular preferred method 200 of the present invention, network elements in the system 100 are used to boost the bit rate/QoS of the UE 110 in the intervening region 110c, bridging the area between locations 110a to 110b, in order to incentivize the travel of the user/UE 110 to location 110b. More particularly, the UE 110 enters a cell serviced by the Macro-eNB access node 130 and is, for example, at location 110a closer to the access node 130 than to the access node 140, and has a first coverage/service-level provided by the access node 130. Network elements 135 associated with the access node 130 detect the coverage/service level of the UE 110 at the first location 110a (step 210) and determine whether the UE 110 at the first location 110a is within a predefined threshold distance of a second location with a significantly better coverage/service-level (e.g., a lightly loaded small cell access node 140) (step 220). Note that, the term "significantly better" coverage/service-level is intended to mean that the second location has a coverage/service-level (due to the small cell access node 140) of greater than a predetermined threshold better than the coverage/service level available to the UE 110 at the first location. In one preferred embodiment, the threshold is a large threshold, for example, the coverage/service-level at the second location is at least 2× the coverage/service-level at the first location. If desired, the threshold is determined based on a metric for the service-level improvement of the second location relative to the first location is sufficiently large compared to a metric for the distance between the first and second locations. Thus, the system may only offer the user the option for guided, enhanced QoS when the benefit opportunity is relatively large compared to the inconvenience to the user.

The network elements 135 additionally detect whether, in an intervening region 110c between the first and second locations, 110a, 110b, the coverage/service-level is worse than the coverage/service-level at the first location 110a. Step 230. The network elements 135 can include known network components, such as one or more mobility management entities (MME), location servers, OEM platform, campaign management system, etc. In a multivendor environment, location server and/or eNB's, and/or OAM and/or an eNB system could provide input to the network elements (e.g., to a CEM/campaign management system), which would then trigger/generate the offers according to the method 200.

If the coverage along the route between the first and second locations 110a, 110b is not worse than at the first location, there is no need to artificially boost the coverage-signal-level along the path 120. However, if the detection in step 230 indicated that the signal-level in the intervening region 110c is worse, the network elements 135 can provide a higher level of service to the UE 110, as it moves incrementally between the first location 110a and the second location 110b, along the path 120, as illustrated in FIG. 3. In one particular embodiment of the invention, the higher level of service is provided in response to an offer made to the user and/or contingent upon the users sufficiently rapid continued progress towards the second location.

For example, in one particular embodiment of the invention, in response to the detection in step 230, an option is offered by the network elements 135 to the user, via an offer message on the UE 110, for a managed movement from the first location 110a to the more advantageous second location 110b. Step 240. The offer can be provided to the user by a number of different mechanisms. For example, the offer may be provided as part of a "campaign" mechanism, which offers the user specific services in return for a specific payment. In one particular embodiment, the user receives an offer for better service in a current location only if the user will agree to pay an additional amount, such as five dollars. The offer can come as part of a mobile application or app, such as a customer experience management app. Additionally, if desired, the offer can be provided from a location server, such as a location server for the mobile network.

In the present particular embodiment, only if the offer is accepted (step 250), does the network elements 135 provide a boosted or artificially higher level of service as the user moves incrementally between the first and the second locations 110a, 110b. Step 260. The service-level boost may be achieved through either PCRF/QoS signaling, or through direct QoS signaling with the eNB. If desired, other conditions may be imposed on the user to obtain the boosted signal-level. For example, in one particular embodiment of the invention, the user must also commit to staying in the second location 110b for a given duration as a precondition to receiving the boosted coverage/signal-level.

Additionally, in one particular embodiment of the invention, the progress of the UE 110 between the locations 110a, 110b is monitored to ensure that the UE 110 is progressing at a sufficiently rapid pace along the path 120. Step 270. For example, in one particular embodiment, the user has to achieve certain levels of movement towards the second location within certain predefined time intervals or the system will stoop boosting the level of the service. Such monitoring continues so long as progress is being made (step 290) and until an exit condition has been met, i.e., the second location has been reached or a preset time has expired (i.e., "timed-out") (steps 280 and 290). If an exit condition has been reached (step 280), the network elements 125 continue to monitor the UE 110 to determine if a more efficient location is within a threshold distance (step 210, etc.). If an exit condition has not been reached, and it has been determined that progress is not being (step 290) towards the second location, i.e., the user stops moving towards the second location, the service level boost may be stopped or reduced, providing a normal or lower level of higher service (step 300), until progress to the second location of a predetermined level is again being made or an exit condition has been reached (steps 270-290).

Figure 5:
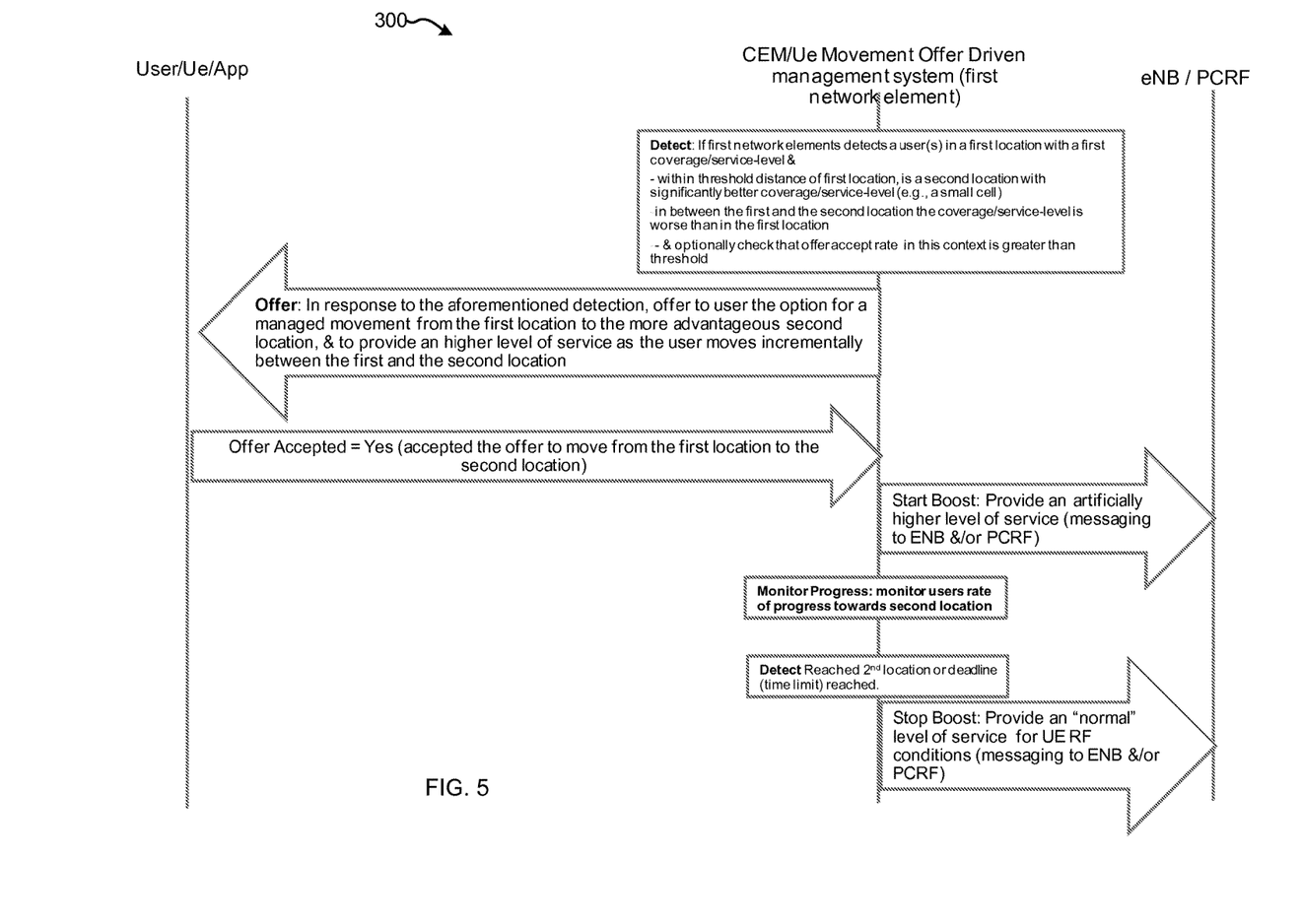
FIG. 5 is a generalized interaction diagram for a method of performing load balancing in accordance with one particular embodiment of the invention.

An offer based load balancing system 300, in accordance with one particular embodiment of the present invention, will now be described more particularly in connection with FIGS. 1 and 4-5. As described above in connection with the method 200, a network elements 135 may detect that a UE 110 in a first location 110a with a first coverage/service level is within a threshold distance of a second location 110b with significantly better coverage/service-level, but separated by an intervening region 110c having worse coverage/service-levels than the first location 110a. In one particular embodiment, the network elements 135 include or communicate with a customer experience management platform (OEM) that manages the offer process. In response to a determination that efficiencies could be gained by the movement of the UE 110 to the location 110b, a first network element (associated with the access node 130) and/or the OEM provides an offer to the UE 110. The offer is displayed to the user on the UE 110 by software, firmware and/or an application (app) running thereon. The offer presents the user the option of a managed movement from the first location 110a, to the more advantageous second location 110b, with the provision of a higher level of service as the user moves incrementally between the first and second locations 110a, 110b. If desired, the offer may include information to aid the user in making the acceptance decision, such as, the service-level anticipated at the second location, the timer interval within which the UE must move to the second location, the service-level anticipated in the first, second and/or third locations, etc.

As discussed above, in one particular embodiment of the invention, the offer is only made if the second location has a coverage/service level from the small cell access node exceeding a predetermined threshold (preferably, a large threshold) better than the coverage/service level available to the UE 110 at the first location. Such a threshold can be determined based on a metric for the service-level improvement of the second location relative to the first location is sufficiently large compared to a metric for the distance between the first and second locations. Thus, the system may only offer the user the option for guided, enhanced QoS when the benefit opportunity is relatively large compared to the inconvenience to the user.

In the present embodiment, if the user does not accept the offer, the user could forego the geographic load-balancing benefits offered by the present invention, choosing not to change their location, due to the intervening region of lower service quality. Such a user would then suffer from the problems associated with users that do not change their locations, i.e., lower levels of UE responsiveness due to highly loaded access nodes, greater battery drain and lower levels of customer experience.

If the user accepts the offer, a message indicating the acceptance is returned from the UE 110 to the first network element or OEM. The indication of such acceptance is recorded in the network resources and stored for later purposes, such as data tracking and billing purposes. If desired, a determination of whether or not to make an offer to the user in the future could, optionally, be based on the past offer acceptance rate of the user in this context. Such past offer acceptance rate could, optionally, be checked in the method 200 before extending an offer, and the offer extended only if the past offer acceptance rate exceeds a preset threshold for offers in made in a similar context (i.e., the user has accepted more than a threshold fraction of such offers, at a higher rate than in other contexts). Other uses of the stored offer acceptance usage can be made.

If desired, other types of historical information can be used in deciding whether or not to even make the offer. For example, the offer may be made if, in addition to or instead of the foregoing considerations, it is determined that the user is using a particular level of traffic/service usage. For example, if the user is not transferring sufficiently large volumes of data, it does not really matter in which location the user is located, and the offer need not be made. Similarly, if the user (and/or other similar users) has previously exhibited a specific level of mobility (i.e., the user is not static and not extremely fast), the system may decide not to make the offer to the user. Additionally, the system may look at whether the user (and/or other similar users) has previously moved incrementally in the direction of improved service when given such a service-level gradient.

For example, in one particular embodiment of the invention, the system automatically determines, based on historical data, that in certain areas users, in general (i.e., not limited to a specific user), are amenable to changing locations from certain first locations to certain second locations. To illustrate this, consider a particular plaza where tourists have demonstrated their flexibility in changing their location, for example, to move to a different location in the plaza (i.e., towards a bench or other hospitable location in the plaza) to upload their photos. It is rare for the same tourist to visit the same location multiple times. However, the system can use the historical data obtained from the behavior of a multitude of tourists who have visited this plaza in the past to make a suggestion for a particular tourist who is visiting the plaza for the first time. Conversely, the system could use historical data to determine that, based on past user behavior, no user will ever agree to move from a certain specific location to a certain second location, because that second location is not sufficiently appropriate/hospitable (e.g., it may be a private location walled off from the general public). This type of historical data of past users can, thus, be used to determine not to make an offer to a current user based on the actions of past users.

Additionally, if desired, the decision of whether or not to extend the offer can depend on whether the user has generated a request to receive such offer, and/or whether the user or location has been designated as a high value user or location by the CEM subsystem.

Once the indication of the accepted offer has been received from the UE 110, the first network element/CEM informs the access node or eNB and/or the Policy and Charging Rules Function (PCRF) to start the boost, i.e., to provide an artificially higher level of service. The first network element/CEM then monitors the user's rate of progress towards the second location 110b and checks for an exit condition. In one particular embodiment of the invention, the system is configured to provide an incrementally higher and higher level of service, the farther the UE progresses toward the second location. For example, in that embodiment, a smooth service-level/bit rate gradient will "smoothly" encourage the user to move in directions that are generally more suitable/desirable given the system loading, topology/CSP priorities.

Once an exit condition has been detected (the second location 110b has been reached or a deadline has been reached (i.e., "timed-out"), the first network element/CEM provides a message to the eNB and/or PCRF to stop the boost, i.e., to provide a "normal" level of service to the UE 110 based on the RF conditions. The UE 110 is, thus, returned to a normal service level for the location and conditions.

The present invention provides a novel mechanism for managing geographic load balancing, optimally, by transferring users from a macro cell, to a nearby, lightly loaded small cell. This generates significant benefits for the operator by putting otherwise wasted resources to use and shedding loading with a relatively loaded cell for greater efficiency. This additionally generates significant benefits for the user, who achieves a better service-level without suffering worse service-levels in the intervening region. This load balancing additionally improves the user's battery life drain as compared to communicating with a more distant macro cell (providing, in some cases a 1.5 times reduction in current drain rate).

Figure 6:
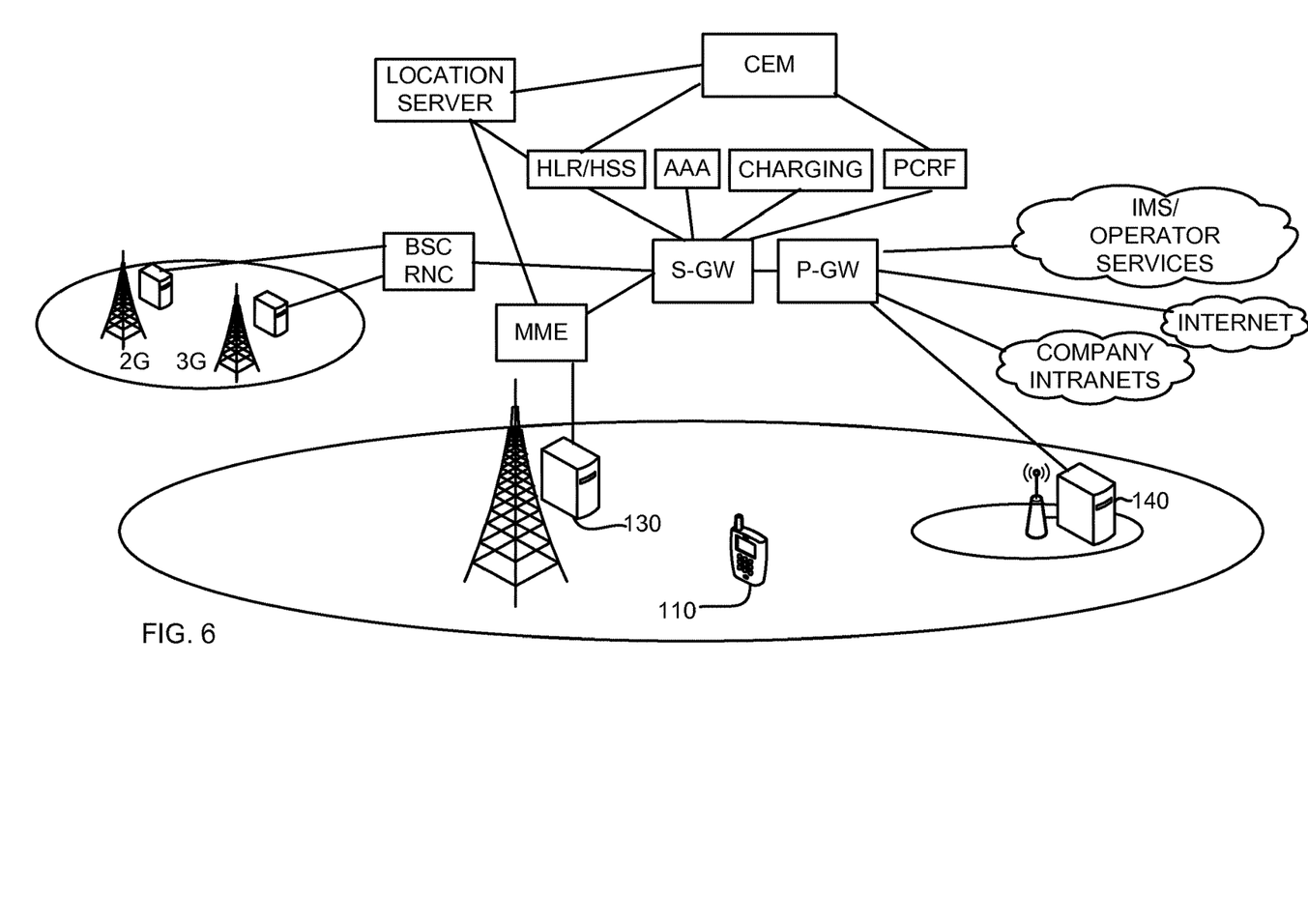
FIG. 6 is a simplified diagram of one example of a radio communications system in which the invention can be used.

Referring now to FIG. 6, there is shown one particular example of a radio communications system in which the present invention can be used. More particularly, an evolved packet core system is shown wherein the UE 110 is in a macrocell including the macro eNB access node 130 and a small cell access node 140. In one particular preferred embodiment of the invention, the access node 140 is an evolved packet data gateway (ePDG) that is linked to a packet data network gateway P-GW. The packet data network gateway P-GW connects the user/UE to a services and packet data network through which can be accessed the Internet, company intranets, operator services, IP multimedia subsystems IMS, etc.

Additionally, the eNB access node 130 connects the UE 110 to the packet data network gateway P-GW, via a serving gateway S-GW. This connection facilitates the transfer of IP data traffic between the user equipment UE 110 connected to access node 130 and the external networks of the services and packet data network. A mobility management entity MME deals with the control plane, tracking and paging the UE in idle-mode and handling the signaling related to mobility and security. Via the control plane, the mobility management entity MME accesses the home subscriber server and home location register HLR/HSS, the authentication, authorization and accounting module AAA, the Policy and charging enforcement functions and the policing and charging rules function PCRF. The OEM can access the data in these modules for, among other things, billing purposes. A location server may additionally be provided. Further, in a multi-access, multi-service system, other access networks (such as 2G and 3G) can additionally be connected to the service gateway S-GW via a base station controller BSC or radio network controller RNC, if desired. It is important to note that the system of FIG. 6 is provided for illustrative purposes only. The invention is not meant to be limited only to the system of FIG. 6, but can clearly be adapted for use in other system configurations and with other elements not shown.

Furthermore, the network devices or network elements and their functions described herein may be implemented by software, e.g. by a computer program product for a computer, or by hardware. In any case, for executing their respective functions, correspondingly used devices, such as the user equipment, access nodes, MME, S-GW, P-GW, OEM, location server, etc., include several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

For the purpose of the present invention as described herein above, it should be noted that:

an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, tablet, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

It should be noted, that reference signs in the claims shall not be construed as limiting the scope of the claims. Additionally, although the invention is illustrated and described herein as embodied in a system and method for managing offer and user equipment movement driven small cell load balancing, it is nevertheless not intended to be limited to only these details shown, as various modifications and structural changes may be made therein without departing from the spirit of the invention and within the scope and range of equivalents of the claims.

I claim:

1. A method for managing movement driven load balancing, comprising:
    detecting a first coverage or service-level for a user device at a first location;
    determining whether the user device at the first location is within a predetermined threshold distance of a second location having a second coverage or service-level that is better than the first coverage or service-level;
    determining whether a coverage or service-level in an intervening location is worse than the first coverage or service-level, wherein the intervening location separates the first location and the second location, the second coverage or service-level not being available at the intervening location; and
    providing, based on the determination, boosted coverage or service-level to the user device in the intervening location as the user device moves from the first location to the second location.

2. The method according to claim 1, wherein the second coverage or service-level is at least two times better than the first coverage or service-level.

3. The method according to claim 1, wherein the coverage or service-level is increased incrementally the farther the user device progresses towards the second location.

4. The method according to claim 1, wherein the user device is serviced by a macro cell at the first location and by a small cell at the second location.

5. The method according to claim 1, wherein the boosted coverage or service-level is achieved through either a policy and changing rules function or a quality of service signaling.

6. The method according to claim 1, wherein the boosted coverage or service-level is achieved through direct QoS signaling with an eNB.

7. The method according to claim 1, further including the step of recording an indication relating to the implementation of the boosted coverage or service-level.

8. The method according to claim 7, wherein the recorded indication is used for billing for the boosted coverage or service-level.

9. The method according to claim 1, further including the step of providing an offer for boosted coverage to a user device prior to providing the boosted coverage or service-level to the user device, the boosted coverage being provided based on the determinations and if a message is received from the user device indicating acceptance of the offer.

10. The method according to claim 9, wherein the offer includes information on at least one of:
    a duration for which the user device must stay at the second location to receive the boosted coverage;
    a service-level anticipated at the second location;
    a time interval within which the user device must move to the second location; or
    the service-levels anticipated in the first, second and/or third locations.

11. The method according to claim 9, wherein the offer is provided to the user based on a past rate of acceptance of similar offers by the user and/or by other users in a similar context.

12. The method according to claim 1, further including the step of discontinuing the boosted coverage or service-level provided to the user device if the user device does not achieve predetermined levels of movement within predefined time intervals.

13. A system for providing movement driven load balancing of a radio communication network, comprising:
    a first access node;
    a second access node having a relatively lighter load than said first access node; and
    at least one network element configured to:
    detect a first coverage or signal-level of a user device at a first location near said first access node;
    determine whether the user device at the first location is within a predetermined threshold distance of a second location having a second coverage or service-level provided by the second access node that is better than the first coverage or service-level;
    determine whether a coverage or service-level in an intervening location is worse than the first coverage or service-level, wherein the intervening location separates the first location and the second location, the second coverage or service-level not being available at the intervening location; and
    provide, based on the determinations made by the at least one network element, boosted coverage or service-level to the user device in the intervening location as the user device moves from the first location to the second location.

14. The system of claim 13, wherein the first access node is a macro cell access node and the second access node is a small cell access node neighboring the macro cell access node.

15. The system according to claim 13, wherein the at least one network element incrementally increases the coverage or service-level of the user device the farther the user device progresses towards the second location.

16. The system according to claim 13, further including the step of recording an indication relating to the implementation of the boosted coverage or service-level for billing for the boosted coverage.

17. The method according to claim 13, further including the step of providing an offer for boosted coverage to the user device prior to providing boosted coverage in the intervening location, the boosted coverage or service-level being provided based on the determinations and subject to a message being received from the user device indicating acceptance of the offer.

18. The system according to claim 17, wherein the offer includes information on at least one of:
    a duration for which the user device must stay at the second location to receive the boosted coverage;
    a service-level anticipated at the second location;
    a time interval within which the user device must move to the second location; or
    the service-levels anticipated in the first, second and/or third locations.

19. The system according to claim 13, wherein the at least one network element is additionally configured to discontinue the boosted coverage or service-level provided to the user device through the intervening location if the user device does not achieve predetermined levels of movement within predefined time intervals.

20. A network element, comprising:
    at least one processor; and
    at least one memory including computer program code,
    wherein the at least one memory and the computer program code are configured to, with the at least one processor, cause the apparatus at least to:
    detect a first coverage or service-level for a user device at a first location;
    determine whether the user device at the first location is within a predetermined threshold distance of a second location having a second coverage or service-level that is better than the first coverage or service-level;
    determine whether a coverage or service-level in an intervening location is worse than the first coverage or service-level, wherein the intervening location separates the first location and the second location, the second coverage or service-level not being available at the intervening location; and
    provide, based on the determination, boosted coverage or service-level to the user device in the intervening location as the user device moves from the first location to the second location.

* * * * *